United States Patent
Jayadeva

(10) Patent No.: US 10,891,559 B2
(45) Date of Patent: Jan. 12, 2021

(54) CLASSIFYING TEST DATA BASED ON A MAXIMUM MARGIN CLASSIFIER

(71) Applicant: INDIAN INSTITUTE OF TECHNOLOGY, DELHI, New Delhi (IN)

(72) Inventor: Jayadeva, New Delhi (IN)

(73) Assignee: INDIAN INSTITUTE OF TECHNOLOGY DELHI, New Delhi (IN)

( * ) Notice: Subject to any disclaimer, the term of this patent is extended or adjusted under 35 U.S.C. 154(b) by 1043 days.

(21) Appl. No.: 15/104,197

(22) PCT Filed: Dec. 12, 2014

(86) PCT No.: PCT/IB2014/002751
§ 371 (c)(1),
(2) Date: Jun. 13, 2016

(87) PCT Pub. No.: WO2015/087148
PCT Pub. Date: Jun. 18, 2015

(65) Prior Publication Data
US 2016/0379138 A1 Dec. 29, 2016

(30) Foreign Application Priority Data
Dec. 12, 2013 (IN) .......................... 3615/DEL/2013

(51) Int. Cl.
*G06N 20/00* (2019.01)
*G06K 9/62* (2006.01)
*G06N 5/02* (2006.01)
*G10L 17/06* (2013.01)

(52) U.S. Cl.
CPC .......... *G06N 20/00* (2019.01); *G06K 9/6269* (2013.01); *G06N 5/022* (2013.01); *G10L 17/06* (2013.01)

(58) Field of Classification Search
CPC ........ G06N 20/00; G06N 20/10; G06N 20/20; G06N 5/22; G06N 5/02; G06N 5/022; G10L 17/06; G06K 9/6269
(Continued)

(56) References Cited

U.S. PATENT DOCUMENTS

| 5,649,068 A | 7/1997 | Boser et al. |
| 2003/0101161 A1* | 5/2003 | Ferguson ........... G05B 13/0265 |

(Continued)

OTHER PUBLICATIONS

Hur et al., A User's Guide to Support Vector Machines, 2010, Springer Science+Business Methods, Chapter 13 in Data Mining Techniques for the Life Sciences, Methods in Molecular Biology 609, pp. 223-239. (Year: 2010).*
Cynthia Rudin, Kernels, 2012, MIT 15.097 Course Notes, pp. 1-20 (Year: 2012).*

(Continued)

*Primary Examiner* — Shane D Woolwine
(74) *Attorney, Agent, or Firm* — Procopio, Cory, Hargreaves & Savitch LLP

(57) ABSTRACT

Systems and methods for classifying binary data based training data having a predefined sample size is obtained. The training data is composed of separable binary datasets. An exact bound on Vapnik-Chervonenkis (VC) dimension of a classifier for the training data is determined. The exact bound is based one or more variables defining the hyperplane. The exact bound may be minimized for generating a classifier for predicting one class to which a given data sample of the training data belongs.

22 Claims, 2 Drawing Sheets

(58) Field of Classification Search
USPC .................................... 706/12, 19, 20, 21
See application file for complete search history.

(56) References Cited

U.S. PATENT DOCUMENTS

| | | | | |
|---|---|---|---|---|
| 2003/0200188 A1* | 10/2003 | Moghaddam | ........ | G06K 9/6256 |
| | | | | 706/25 |
| 2003/0202704 A1* | 10/2003 | Moghaddam | .......... | G06N 20/00 |
| | | | | 382/224 |
| 2006/0212413 A1* | 9/2006 | Rujan | .................. | G06K 9/6269 |
| | | | | 706/20 |
| 2008/0247652 A1* | 10/2008 | Mohamed | ............ | G06K 9/6255 |
| | | | | 382/224 |
| 2010/0063948 A1* | 3/2010 | Virkar | .................... | G06N 20/00 |
| | | | | 706/12 |

OTHER PUBLICATIONS

Thomas Martinetz, MaxMinOver: A Simple Incremental Learning Procedure for Support Vector Classification, 2004, IEEE, pp. 2065-2070. (Year: 2004).*
International Search Report and Written Opinion for PCT App No. PCT/IB2014/002751 dated Apr. 22, 2015, 9 pgs.
Pham, M-T, et al., Detection With Multi-Exit Asymmetric Boosting, In Proceedings of the IEEE Conference on Computer Vision and Pattern Recognition (CVPR), Anchorage, AK, Jun. 23-28, 2008, 8 pgs.
Scott, C., Comparison and Design of Neyman-Pearson Classifiers, Department of Statistics, Rice University, Houston, TX, Oct. 2005, 20 pgs.

\* cited by examiner

CLASSIFYING TEST DATA BASED ON A MAXIMUM MARGIN CLASSIFIER

BACKGROUND

Learning machines utilize a variety of training approaches for analyzing data and recognizing patterns. As part of such approaches, the learning machines are trained to generalize using data with known outcomes. Once such learning machines are trained, they may be subsequently used for classification of actual data in cases where the outcome is unknown. For example, a learning machine may be trained to recognize patterns in data. Learning machines may be trained to solve a wide variety of problems across a variety of disciplines. An example of such a learning machine is a support vector machine (SVM). It should be noted that the data to be analyzed may correspond to a variety of technical fields, such as biotechnology, and image processing.

BRIEF DESCRIPTION OF THE DRAWINGS

The following detailed description references the drawings, wherein.

SUMMARY

Figure 1:
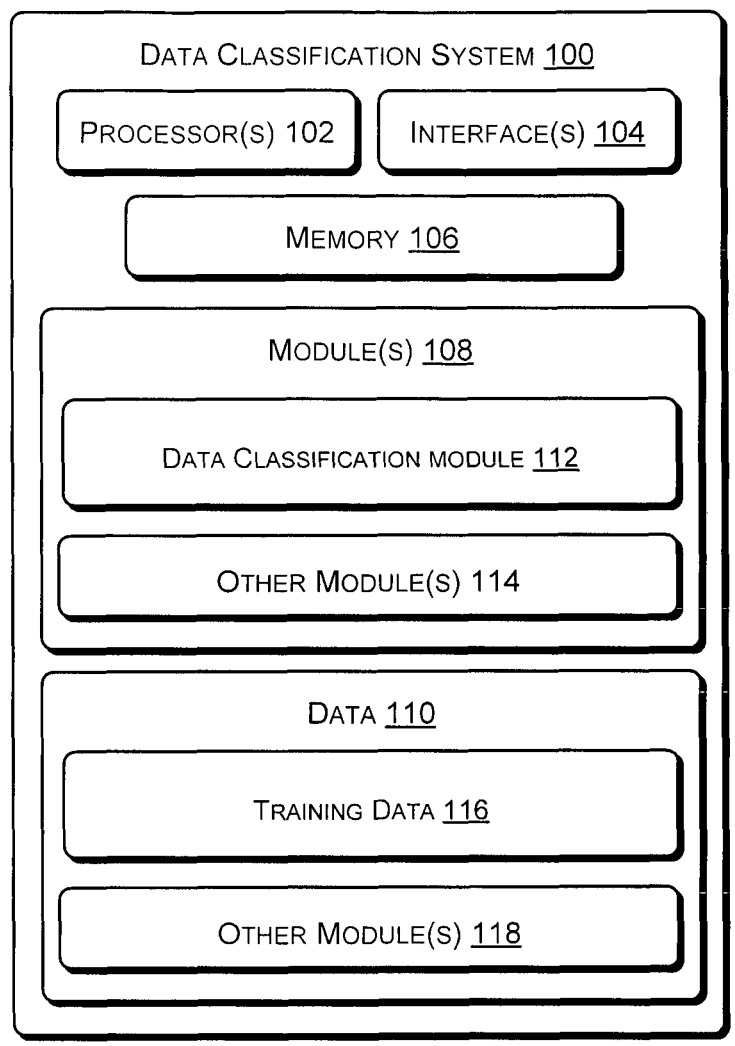
FIG. 1 is a block diagram of a data classification system, as per an implementation of the present subject matter.

This summary is provided to introduce concepts related to systems and methods for cutting holes onto a sheet-metal assembly. The concepts are further described below in the detailed description. This summary is not intended to identify essential features of the claimed subject matter nor is it intended for use in determining or limiting the scope of the claimed subject matter.

Systems and methods for classifying data and enable learning of machines, are described. In one implementation, training data having a predefined sample size is obtained. In the present implementation, the training data is composed of separable datasets. Subsequently, a Vapnik-Chervonenkis (VC) dimension for the training data is determined. Based on the VC dimension, an exact bound on the VC dimension is further determined. On obtaining the exact bound on the VC dimension, the exact bound is minimized. Based on the minimizing of the exact, a classifier is obtained. The generated classifier may be used for predicting at least one class to which samples of the training data belong.

These and other aspects of the present subject matter are further described in conjunction with the detailed description, as provided in the sections below:

DETAILED DESCRIPTION

Recent developments in technology have seen an increase in usage of computing devices. Such computing devices may be used in variety of technological fields, such as image processing, searching, biotechnology (gene classification), and others. In such cases, the computing devices may perform a variety of operation based on volumes of data. Processing of data is typically implemented using computing programs and predefined rule/conditions which are rigid.

However, for certain objectives, such functionalities may not be efficiently carried out using programming alone. Example applications include spam filtering, optical character recognition (OCR), and search engines, to name a few. In such cases, computing devices may follow approaches which rely on data processing models which are based on presently available data. The available data includes input data and known outcomes corresponding to the input data. Based on the available data, various prediction or decisions may be implemented rather than carrying out such decisions based on rigid programmed instructions.

An example of such computing devices includes support vector machines (SVMs). Prior to determining which category or class a given occurrence may correspond to, a stage of learning is implemented. During the learning stage, given a set of training examples, each marked as belonging to one of two categories, an SVM training algorithm builds a model that assigns new occurrences into one category or the other. As part of learning stage, a classifier may be obtained. The classifier may be considered as a logical separation which separates two or more classes or groups to which the training examples may relate to. Generally, the classifier may be determined based on the characteristics of the training examples themselves. The type of the classifier may in turn be dependent on the type of the training examples themselves. If the training examples are linearly separable, the classifier may be a linear classifier. An example of a linear classifier may include a straight line or a plane if the training examples may be represented in a Euclidean space. In case the instances of the training examples are non-linearly separable, the resulting classifier may be a non-linear function.

The determination of such classifiers may be carried out through computing devices. Such computing devices may, based on characteristics of training examples, determine the appropriate classifier. In operation, such computing devices may tend to obtain the classifier by generalization of the training examples to obtain a model based on which subsequent decisions on given data may be carried out. An example of such generalization is Vapnik-Chervonenkis dimension (VC dimension), which measures a capacity of a classification approach. As is understood, capacity of any classification approach also provides an indication of the complexity. For example, any classifier which is characterized by a high VC dimension is complex, and a classifier characterized by a low VC dimension is considered as less complex. It is therefore desired that any generalizations which are carried out, are to have a low VC dimensions. As should be noted, any computing device based on a low VC dimension would tend to generalize better when compared with system having high VC dimensions, as such systems would tend to overfit while obtaining a classifier. It is for this reason a classifier being characterized by low VC dimension would be desired.

While obtaining a classifier with low VC dimensions, the entire training may have to be analyzed to obtain the classifier. In such a case, all characteristics or features of the training data may be utilized for obtaining the classifier. However, this approach may typically involve considering all characteristics of the training data. This may in turn require considerable processing resources and may not provide an accurate classifier which most suitably distinguishes between different classes to which the training data may correspond to.

In the case of a nonlinear classifier, the VC dimension is related to the number of support vectors used by the classifier. The number of computations required to be performed when testing a test sample whose outcome or result is not known, is proportional to number of support vectors. The support vectors are typically a subset of the training set. The storage or memory cost of the trained learning machine is also proportional to the number of support vectors. The number of support vectors thus has an impact on the run time of an application using such a learning machine. On a portable or embedded device such as a smart-phone, the speed of processing, the energy consumption, and consequently, the battery life, depends considerably on the number of computations and data access. Furthermore, the manners in which the classifiers for SVMs are obtained depend on the solving of quadratic functions. Solving such functions require consideration processing and storage resources. Implementing such mechanisms for hand-held computing devices may not therefore be efficient.

To this end, approaches for classifying data are described. In one implementation, the classification of the data is based on a maximum margin classifier having a low VC dimension. The low VC dimension classifier is obtained based on functions which form the exact bound on the VC dimension. Once the exact bound on the VC dimension is obtained, the same is minimized to obtain the classifier. As would be explained in the following sections, the classifier thus obtained is of low VC dimension. Furthermore, the classifier is obtained by considering non-redundant and only essential characteristics of the training data. In such a case, the processing required is less and the process of obtaining the classifier is efficient. Furthermore, since the basis on which the classification is performed also may involve less number of features, the process of classification is fast and more efficient. Various experimental results are also shared in the following description indicating the increased efficiency in which the classification is carried out.

Aspects the present subject matter meet the above-identified unmet needs of the art, as well as others, by providing computing systems for recognizing patterns and significant discriminative features in data, such as images, and bioinformatics databases, building classifiers using such data, and providing predictions on other data whose result or outcome is not known. In particular, aspects of the present subject matter implement computing devices for recognition of images such as handwritten or printed characters, text, or symbols, such as handwritten text, characters, or symbols. These may be used for analyzing biological and medical information, such as the gene expression data provided by microarrays.

The above mentioned implementations are further described herein with reference to the accompanying figures. It should be noted that the description and figures relate to exemplary implementations, and should not be construed as a limitation to the present subject matter. It is also to be understood that various arrangements may be devised that, although not explicitly described or shown herein, embody the principles of the present subject matter. Moreover, all statements herein reciting principles, aspects, and embodiments of the present subject matter, as well as specific examples, are intended to encompass equivalents thereof.

FIG. 1 depicts an exemplary data classification system 100 implemented as a computing-device, for carrying out a hole forming process for a sheet-metal assembly. The data classification system 100 may be implemented as a stand-alone computing device. Examples of such computing devices include laptops, desktops, tablets, hand-held computing devices such as smart-phones, or any other forms of computing devices. Continuing with the present implementation, the data classification system 100 may further include a processor(s) 102, interface(s) 104 and memory 106. The processor(s) 102 may also be implemented as signal processor(s), state machine(s), logic circuitries, and/or any other device or component that manipulate signals based on operational instructions.

The interface(s) 104 may include a variety of interfaces, for example, interfaces for data input and output devices, referred to as I/O devices, storage devices, network devices, and the like, for communicatively associating the data classification system 100 with one or more other peripheral devices. The peripheral devices may be input or output devices communicatively coupled with the data classification system 100. The interface(s) 104 may also be used for facilitating communication between the data classification system 100 and various other computing devices connected in a network environment. The memory 106 may store one or more computer-readable instructions, which may be fetched and executed for carrying out a forming process for a sheet-metal assembly. The memory 106 may include any non-transitory computer-readable medium including, for example, volatile memory, such as RAM, or non-volatile memory such as EPROM, flash memory, and the like.

The data classification system 100 may further include module(s) 108 and data 110. The module(s) 108 may be implemented as a combination of hardware and programming (e.g., programmable instructions) to implement one or more functionalities of the module(s) 108. In one example, the module(s) 108 includes a data classification module 112 and other module(s) 114. The data 110 on the other hand includes training data 116, classifier 118, and other data 120.

In examples described herein, such combinations of hardware and programming may be implemented in a number of different ways. For example, the programming for the module(s) 108 may be processor executable instructions stored on a non-transitory machine-readable storage medium and the hardware for the module(s) 108 may include a processing resource (e.g., one or more processors), to execute such instructions. In the present examples, the machine-readable storage medium may store instructions that, when executed by the processing resource, implement module(s) 108 or their associated functionalities. In such examples, the data classification system 100 may include the machine-readable storage medium storing the instructions and the processing resource to execute the instructions, or the machine-readable storage medium may be separate but accessible to data classification system 100 and the processing resource. In other examples, module(s) 108 may be implemented by electronic circuitry.

In operation, the data classification system 100 may receive set of training data. In one implementation, the training data may include examples which correspond to two or more distinct classes. The training data may further be linearly separable or non-linearly separable. In one example, the training data may be obtained from training data 116. Once the training data 116 is obtained, the data classification module 112 may further determine a Vapnik-Chervonenkis (VC) dimension corresponding to the training data 116. Once the VC dimension is obtained, the data classification module 112 may further determine an exact bound for the VC dimension. The exact bound may be considered as upper and lower limits for the VC dimension. Subsequently, the data classification module 112 may minimize the exact bounds on the VC dimension to obtain the classifier. In one example, the exact bound may be a function of a distance of closest distance of a point from amongst the training data from a notional hyperplane. The notional hyperplane may be such that it classifies plurality of points within the training data with zero error. In one implementation, the notional hyperplane may be expressed using the following expression:

$$u^T x + v = 0 \qquad (5)$$

wherein $u^T$ is a row vector containing the same n elements in that order
v: is a scalar denoting the offset or bias associated with the hyperplane $u^T x + v = 0$ The operation of the data classification system 100 is further explained in conjunction with the following relations. It should be noted that the following relations are only exemplary and should not be construed as a limitation. Other relations expressing the same or similar functionality would also be within the scope of the present subject matter.

In the present implementation, the training data 116 may include binary classification datasets for which a classifier is to be determined. The training data 116 may include data points $x^i$, $i = 1, 2, \ldots, M$, and where samples of class +1 and −1 are associated with labels $y^i = 1$ and $y^i = -1$, respectively. For the present training data 116, the dimension of the input sample is assumed to be n.

It should be noted that the set of all gap tolerant hyperplane classifiers with margin $d > d_{min}$, the VC dimension is bounded by the following function:

$$\gamma \leq 1 + \text{Min}\left(\frac{R^2}{d_{min}^2}, n\right) \qquad (1)$$

where R is the radius of the smallest sphere enclosing all the training samples.

Equation (1) suggests that minimizing the machine complexity requires
maximizing the margin as well as minimizing $R^2$. Since the square function increases monotonically, and since both R and $d_{min}$ are positive quantities, in one implementation, the data classification system 100 minimizes R/dmin. In another implementation, the dimension n is large.

As mentioned previously, the training data 116 may be linearly separable or non-linearly separable. For the implementation where the training data 116 is linearly separable, a notional hyperplane may exist which can classify these points with zero error, which can be represented by the following relation:

$$u^T x + v = 0$$

With the above relation, the margin may be considered as the distance of the closest point within the training data 116, from the hyperplane, and is given by:

$$\text{Min}_{i=1,2,\ldots M} \frac{\|u^T x^i + v\|}{\|u\|} \qquad (2)$$

From the above, the following relation may also be derived:

$$\frac{R}{d} = \frac{\text{Max}_{i=1,2,\ldots M} \|x^i\|}{\text{Min}_{i=1,2,\ldots M} \frac{\|u^T x^i + v\|}{\|u\|}} \qquad (3)$$

which may also be represented as:

$$\frac{R}{d} = \frac{\text{Max}_{i=1,2,\ldots M} \|u\| \|x^i\|}{\text{Min}_{i=1,2,\ldots M} \|u^T x^i + v\|} \qquad (4)$$

Since in the present implementation, gap-tolerant classifiers with a margin $d \geq d_{min}$ are considered, we have $$\text{Min}_{x^i} \frac{\|u^T x^i + v\|}{\|u\|} \geq d_{min} \qquad (5)$$

$$\Rightarrow \|u\| \leq \frac{\text{Min}_{i=1,2,\ldots,M} \|u^T x^i + v\|}{d_{min}} \leq \frac{\text{Max}_{i=1,2,\ldots,M} \|u^T x^i + v\|}{d_{min}} \qquad (6)$$

$$\qquad (7)$$

This gives:

$$\|u\| \text{Max}_{i=1,2,\ldots,M} \|x^i\| \leq \text{Max}_{i=1,2,\ldots,M} \|u^T x^i + v\| \cdot \frac{\text{Max}_{i=1,2,\ldots,M} \|x^i\|}{d_{min}} \qquad (8)$$

$$\|u\| \text{Max}_{i=1,2,\ldots,M} \|x^i\| \leq \beta \text{Max}_{i=1,2,\ldots,M} \|u^T x^i + v\|, \qquad (9)$$

where $\beta$ is a constant independent of u and v, and dependent only on the dataset and the choice of $d_{min}$.

In order to determine the classifier, the data classification system 100 is to obtain solution for the following relation:

$$\text{Minimize}_{u,v} \frac{\text{Max}_{u,i=1,2,\ldots,M} \|u^T x^i + v\|}{\text{Min}_{u,i=1,2,\ldots,M} \|u^T x^i + v\|} \qquad (10)$$

Since the training data 116 is linearly separable, it may also be represented as:

$$u^T x^i + v \geq 0, \qquad (11)$$
$$\text{if } y_i = 1 (\text{Class 1 points})$$

$$u^T x^i + v \leq 0, \qquad (12)$$
$$\text{if } y_i = -1 (\text{Class } -1 \text{ points})$$

$$\|u^T x^i + v\| = \begin{cases} u^T x^i + v, & \text{if } u^T x^i + v \geq 0 \\ -(u^T x^i + v), & \text{if } u^T x^i + v \leq 0 \end{cases} \qquad (13)$$

From the above, the following can be gathered:

$$\|u^T x^i + v\| = y_i \cdot [u^T x^i + v], i = 1, 2, \ldots, M \qquad (14)$$

It should be noted that the product of the class labels with the distance from the hyperplane is always a non-negative quantity. Considering the above:

$$\text{Min}_{u,v,g,l} \frac{g}{l} \qquad (15)$$

$$g \geq y_i \cdot [u^T x^i + v], \qquad (16)$$
$$i = 1, 2, \ldots, M$$

$$l \leq y_i[u^T x^i + v], \quad i = 1, 2, \ldots, M \tag{17}$$

$$\tag{18}$$

As would be understood, the above expression provided by equation 15 is a linear fractional. In one implementation, the function as described by Equation 15 may be transformed to a linear function by the data classification module 112. For example, the data classification module 112 may apply a Charnes-Cooper transformation, to obtain a linear function. In one implementation, the following is obtained:

$$\underset{u,v,g,p,l}{\text{Min}} h = g \cdot p \tag{19}$$

$$g \cdot p \geq y_i \cdot [p \cdot u^T x^i + v], \quad i = 1, 2, \ldots, M \tag{20}$$

$$l \cdot p \leq y_i \cdot [p \cdot u^T x^i + v], \quad i = 1, 2, \ldots, M \tag{21}$$

$$p \cdot l = 1 \tag{22}$$

Denoting w≡p·u, and b≡p·v, and noting that p·l=1, we obtain the following:

$$\underset{w,b,h}{\text{Min}} h \tag{23}$$

$$h \geq y_i \cdot [w^T x^i + b], \quad i = 1, 2, \ldots, M \tag{24}$$

$$1 \leq y_i \cdot [w^T x^i + b], \quad i = 1, 2, \ldots, M \tag{25}$$

$$\tag{26}$$

which in turn may be further represented as:

$$\underset{w,b,h}{\text{Min}} h \tag{27}$$

$$h \geq y_i \cdot [w^T x^i + b], \quad i = 1, 2, \ldots, M \tag{28}$$

$$y_i \cdot [w^T x^i + b] \geq 1, \quad i = 1, 2, \ldots, M \tag{29}$$

With the above expressions, the data classification module 112 may further determine w and b by solving the above relations. In one implementation, the data classification module 112 may further obtain the following function:

$$f(x) = w^T x + b \tag{30}$$

In one example, a number of features may be gained based on the Equations (27)-(28). The features may be selected for which the value of the $w^T$ is non-zero. Once the features are selected, a classifier may be obtained for points corresponding to such features which may allow focussing on only the selected features for determining a classifier. As would be noted, determining a classifier based on the determined features would involve less processing resources, and better classification results. In another implementation, the feature selection may also be used for compression of data by selecting only the relevant support vectors. For decompression, the reconstruction of the data may be based on such selected support vectors.

In another implementation, the method may involve using, instead of max function, a "soft max" function. In such a case, distance of the points within the data set is measured as a weighted function of distances from a plurality of hyperplanes. Similarly, the min function is replaced by a "soft Min" function.

Accordingly, the class of a test sample x may be determined based on values of y and the sign of the function as depicted by the Equation (30). In one example, the values w and b are stored in classifier parameters 118.

It should also be noted that in general, data sets will not be linearly separable. In one implementation, an error factor may be introduced to counter any misclassification error. In such a case, the Equation (30) may be represented by the following Equations (31)-(34):

$$\underset{w,b,h}{\text{Min}} h = C \cdot \sum_{i=1}^{M} q_i$$

$$h \geq y_i \cdot [w^T x^i + b] + q_i, \quad i = 1, 2, \ldots, M$$

$$y_i \cdot [w^T x^i + b] + q_i \geq 1, \quad i = 1, 2, \ldots, M$$

$$q_i \geq 0, \quad i = 1, 2, \ldots, M.$$

The above description has been provided from the perspective of linearly separable datasets within the training data 116. In case of non-linearly separable datasets within the training data 116, the data classification module 112 may further determine a mapping function φ(x) for mapping input samples within the training data 116 to space having a higher dimension (i.e., >n).

In such a case, for the higher dimensioned space, a notional hyperplane (similar to the hyperplane as described above but qualified for a higher dimension and a function of Φ(x) may be defined by the data classification module 112:

$$u^T \Phi(x) + v = 0 \tag{35}$$

wherein u denotes column vector containing n elements, in which the elements are variables denoted by $u_1$, $u_2$, . . . , $u_n$ for the vector u. The vector u is used to define a separating hyperplane.

φ(x) is nonlinear transformation or mapping.

Similar to Equations (31)-(34), the following Equations (36)-(39) may be obtained as a function of the mapping function, φ(x):

$$\underset{w,b,h,q}{\text{Min}} h + C \cdot \sum_{i=1}^{M} q_i$$

$$h \geq y_i \cdot [w^T \phi(x^i) + b] + q_i, \quad i = 1, 2, \ldots, M$$

$$y_i \cdot [w^T \phi(x^i) + b] + q_i \geq 1,$$

$i = 1, 2, \ldots, M$ $q_i \geq 0,$ $i = 1, 2, \ldots, M.$

The image vectors $\phi(x^i)$, $i=1, 2, \ldots, M$ may be considered as to form an overcomplete basis in the empirical feature space, in which w also lies. From the above, we can therefore also say:

$$w = \sum_{j=1}^{M} \lambda_j \phi(x^j). \tag{40}$$

Therefore, $$w^T \phi(x^i) + b = \sum_{j=1}^{M} \lambda_j \phi(x^j)^T \phi(x^i) + b = \sum_{j=1}^{M} \lambda_j K(x^i, x^j) + b, \tag{41}$$

where K(p,q) denotes the Kernel function with input vectors p and q, and is defined as $$K(p,q) = \phi(p)^T \phi(q). \tag{42}$$

Based on the above, the operation of the data classification module 112 may further continue to obtain the following Equations (43)-(46):

$$\text{Min}_{w,b,h,q} h + C \cdot \sum_{i=1}^{M} q_i$$

$$h \geq y_i \cdot \left[ \sum_{j=1}^{M} \lambda_j K(x^i, x^j) + b \right] + q_i,$$

$i = 1, 2, \ldots, M$ $$y_i \cdot \left[ \sum_{j=1}^{M} \lambda_j K(x^i, x^j) + b \right] + q_i \geq 1,$$

$i = 1, 2, \ldots, M$ $q_i \geq 0,$ $i = 1, 2, \ldots, M.$

Once the variables $\lambda_j$, $j=1, 2, \ldots, M$ and b are obtained, the class of a test point x can be determined by the data classification module 112 based on the following function:

$$\sum_{j=1}^{M} \lambda_j K(x, x^j) + b \tag{47}$$

In another implementation, the data classification module 112 may further determine the classifier by extending the principles described above to other variants. By modifying the measures used for the error term in equations (30) and (43), we can obtain other methods for building learning machines that may offer their own advantages. For example, a classifier for a least squares learning machine may be obtained by solving the following Equations (48)-(51):

$$\underset{w,b,h}{\text{Min}}\, h + C \cdot \sum_{i=1}^{M} q_i^2 \tag{48}$$

$$h \geq y_i \cdot [w^T x^i + b] + q_i, \tag{49}$$
$i = 1, 2, \ldots, M$ $$y_i \cdot [w^T x^i + b] + q_i \geq 1, \tag{50}$$
$i = 1, 2, \ldots, M$ $$\tag{51}$$

with C as the error parameter.

It should be noted that each constraint in will always be met as an equality; if any is met as a strict inequality, then the constraint can be met as an equality while reducing the value of the objective function in Equation (48). Based on the above, the data classification module 112 may obtain the classifier through the following equations (52)-(55):

$$\underset{w,b,h}{\text{Min}}\, h + C \cdot \sum_{i=1}^{M} q_i^2 \tag{52}$$

$$h \geq y_i \cdot [w^T x^i + b] + q_i, \tag{53}$$
$i = 1, 2, \ldots, M$ $$y_i \cdot [w^T x^i + b] + q_i = 1, \tag{54}$$
$i = 1, 2, \ldots, M$ $$\tag{55}$$

Note that the R.H.S. of (53) is identical to the L.H.S. of (54), and constraint (54) indicates that this is equal to 1 at any solution. Hence, we note that h=1, at a solution. Therefore, the objective function can be simplified as follows:

$$\underset{w,b}{\text{Min}}\, C \cdot \sum_{i=1}^{M} q_i^2 \tag{56}$$

$$y_i \cdot [w^T x^i + b] + q_i = 1, \tag{57}$$
$i = 1, 2, \ldots, M$ $$\tag{58}$$

It is obvious to a person versed in the art that the multiplier C is redundant and can be removed, to yield the following:

$$\underset{w,b}{\text{Min}}\, \sum_{i=1}^{M} q_i^2 \tag{59}$$

$$y_i \cdot [w^T x^i + b] + q_i = 1, \tag{60}$$
$i = 1, 2, \ldots, M$ $$\tag{61}$$

In one implementation, the data classification module 112, for non-linear version of the above problem, which is the extension of the formulation using a kernel function, is given by:

$$\underset{w,b}{\text{Min}} \sum_{i=1}^{M} q_i^2 \tag{62}$$

$$y_i \cdot \left[ \sum_{j=1}^{M} \lambda_j K(x^i, x^j) + b \right] + q_i = 1, \tag{63}$$

$$i = 1, 2, \ldots, M$$

In the above Equation, the error variables $q_i$, $i=1, 2, \ldots, M$ may be negative, zero, or positive. In one example, the data classification module 112 may measure the sum of squares of the error variables. In another implementation, the data classification module 112 may select other measures of the error variable, e.g. the L1 norm of the error vector. Accordingly, the following Equations are obtained.

$$\underset{w,b}{\text{Min}} \sum_{i=1}^{M} (q_i^a + q_i^b) \tag{64}$$

$$y_i \cdot [w^T x^i + b] + (q_i^a - q_i^b) = 1, \tag{65}$$

$$i = 1, 2, \ldots, M$$

$$q_i^a, q_i^b \geq 0, \tag{66}$$

$$i = 1, 2, \ldots, M$$

Once the above Equations are obtained, the data classification module 112 may further obtain its non-linear equivalent which is represented by the following set of Equations:

$$\underset{w,b}{\text{Min}} \sum_{i=1}^{M} (q_i^a + q_i^b) \tag{67}$$

$$y_i \cdot \left[ \sum_{j=1}^{M} \lambda_j K(x^i, x^j) + b \right] + (q_i^a - q_i^b) = 1, \tag{68}$$

$$i = 1, 2, \ldots, M$$

$$q_i^a, q_i^b \geq 0, \tag{69}$$

$$i = 1, 2, \ldots, M$$

In one example, a parameter C may further be included to provide a trade-off between the VC dimension bound and the misclassification error. In yet another implementation, the data classification module 112 may consider C as a variable and optimize its value to determine the optimal tradeoff, to provide the following equations:

$$\underset{w,b,h,C}{\text{Min}} h + C \cdot \sum_{i=1}^{M} q_i \tag{70}$$

$$h \geq y_i \cdot [w^T x^i + b] + q_i, \tag{71}$$

$$i = 1, 2, \ldots, M$$

$$y_i \cdot [w^T x^i + b] + q_i \geq 1, \tag{72}$$

$$i = 1, 2, \ldots, M$$

$$q_i \geq 0, \tag{73}$$

$$i = 1, 2, \ldots, M.$$

The Equations (70)-(73) can be gathered as being quadratic. As would be understood, solving such quadratic functions are computationally expensive. In one example, the data classification module 112 may select an appropriate value for C in determining solution for the above mentioned equations. Continuing with the above, the Equations (70)-(73) can also be represented as follows:

$$\underset{w,b,h,C}{\text{Min}} h + C \cdot \sum_{i=1}^{M} q_i \tag{74}$$

$$h \geq y_i \cdot \left[ \sum_{j=1}^{M} \lambda_j K(x^i, x^j) + b \right] + q_i, \tag{75}$$

$$i = 1, 2, \ldots, M$$

$$y_i \cdot \left[ \sum_{j=1}^{M} \lambda_j K(x^i, x^j) + b \right] + q_i \geq 1, \tag{76}$$

$$i = 1, 2, \ldots, M$$

$$q_i \geq 0, \tag{77}$$

$$i = 1, 2, \ldots, M.$$

The above two quadratic functions use a single variable C that multiplies all error variables $q_i$, $i=1, 2, \ldots, M$. In one example, the data classification module 112 may use different variables $c_i$ as weighted factors for each corresponding error variable $q_i$, $i=1, 2, \ldots, M$, which can then be represented as:

$$\underset{w,b,h,c_i, i=1,2,\ldots,M}{\text{Min}} h + \sum_{i=1}^{M} c_i \cdot q_i \tag{78}$$

$$h \geq y_i \cdot [w^T x^i + b] + q_i, \tag{79}$$

$$i = 1, 2, \ldots, M$$

$$y_i \cdot [w^T x^i + b] + q_i \geq 1, \tag{80}$$

$$i = 1, 2, \ldots, M$$

$$q_i \geq 0, \tag{81}$$

$$i = 1, 2, \ldots, M.$$

For the non-linear separable datasets, the above equations may be represented as:

$$\underset{w,b,h,c_i, i=1,2,\ldots,M}{\text{Min}} h + \sum_{i=1}^{M} c_i \cdot q_i \tag{82}$$

$$h \geq y_i \cdot \left[ \sum_{i=1}^{M} \lambda_j K(x^i, y^i) + b \right] + q_i, \tag{83}$$

$$i = 1, 2, \ldots, M$$

-continued $$y_i \cdot \left[\sum_{i=1}^{M} \lambda_j K(x^i, y^i) + b\right] + q_i \geq 1, \quad (84)$$
$$i = 1, 2, \ldots, M$$

$$q_i \geq 0, \quad (85)$$
$$i = 1, 2, \ldots, M.$$

It should be noted that the classifiers as described above, is of low VC dimension and can be obtained for linearly separable and non-linearly separable datasets. Furthermore, the classifier is obtained by considering non-redundant and only essential characteristics of the training data. In such a case, the processing required is less and the process of obtaining the classifier is efficient. Furthermore, since the basis on which the classification is performed also may involve less number of features, the process of classification is fast and more efficient. Various experimental results are also shared in the following description indicating the increased efficiency in which the classification is carried out.

The advantages of the present subject matter are provided with reference to the exemplary implementations are illustrated below. It should also be understood that such implementations are not limiting. Other implementations based on similar approaches would also be within the scope of the present subject matter.

Exemplary Embodiments

Exemplary implementations in accordance with aspects of the invention relating to learning a linear classifier are now discussed with reference to some non-limiting examples. Comparisons are provided with results obtained using LIBSVM, which is a public domain implementation of Support Vector Machines (SVMs).

TABLE 1

Characteristics of the benchmark datasets used.

| Dataset | Size (samples × features × classes) |
|---|---|
| Blogger | 100 × 6 × 2 |
| Fertility diagnosis | 100 × 9 × 2 |
| Promoters | 106 × 57 × 2 |
| Echocardiogram | 132 × 12 × 2 |
| Teaching assistant | 151 × 5 × 3 |
| Hepatitis | 155 × 19 × 2 |
| Hayes | 160 × 5 × 3 |
| Plrx | 182 × 12 × 2 |
| Seed | 210 × 7 × 3 |
| Glass | 214 × 10 × 6 |
| Heartstatlog | 270 × 13 × 2 |
| Horsecolic | 300 × 27 × 2 |
| Haberman | 306 × 3 × 2 |
| E coli | 336 × 8 × 3 |
| House voters | 435 × 16 × 2 |
| Wholesale customers | 440 × 8 × 2 |
| IPLD | 583 × 10 × 2 |
| Balance | 625 × 4 × 3 |
| Australian | 690 × 14 × 2 |
| Crx | 690 × 15 × 2 |
| Transfusion | 748 × 5 × 2 |
| Tic tac toe | 958 × 9 × 2 |
| Sorlie | 85 × 456 × 2 |
| Secom | 1567 × 591 ×2 |
| Tian | 173 × 12626 × 2 |

TABLE 2

| | Present Subject Matter | | Conventional Art | |
|---|---|---|---|---|
| Datasets | Accuracy | Time (s) | Accuracy | Time (s) |
| Blogger | 69.00 + 17.15 | 0.0012 + 6.64e−5 | 58.00 + 20.40 | 6.17 + 2.51 |
| Fertility diagnosis | 88.00 + 9.27 | 0.0013 + 5.27e−5 | 86.00 + 9.01 | 8.12 + 1.47 |
| Promoters | 74.08 + 10.88 | 0.0014 + 4.53e−5 | 67.78 + 10.97 | 0.85 + 0.03 |
| Echocardiogram | 90.88 + 5.75 | 0.0014 + 4.62e−5 | 86.38 + 4.50 | 0.72 + 0.36 |
| Teaching assistant | 66.27 + 6.77 | 0.0013 + 3.46e−5 | 64.94 + 6.56 | 16.07 + 4.17 |
| Hepatitis | 68.38 + 6.26 | 0.0014 + 3.82e−5 | 60.64 + 7.19 | 1.90 + 0.56 |
| Hayes | 76.32 + 9.25 | 0.0012 + 2.73e−5 | 73.56 + 7.73 | 7.19 + 3.81 |
| Plrx | 71.83 + 7.49 | 0.0015 + 3.37e−5 | 71.42 + 7.37 | 4.35 + 0.78 |
| Seed | 97.61 + 1.51 | 0.0015 + 3.97e−5 | 90.95 + 4.09 | 12.37 + 4.51 |
| Glass | 99.06 + 1.16 | 0.0042 + 5.56e−3 | 98.12 + 1.75 | 11.83 + 3.44 |
| Heartstatlog | 84.81 + 3.87 | 0.0018 + 1.47e−5 | 82.59 + 2.22 | 9.43 + 4.25 |
| Horsecolic | 81.00 + 4.03 | 0.0021 + 7.17e−5 | 80.26 + 4.63 | 41.39 + 13.93 |
| Haberman | 73.89 + 3.71 | 0.0019 + 4.34e−5 | 72.56 + 3.73 | 13.74 + 6.63 |
| E coli | 96.73 + 1.96 | 0.0023 + 1.3e−4 | 96.73 + 1.96 | 18.41 + 2.57 |
| House voters | 95.63 + 1.84 | 0.0031 + 1.87e−4 | 94.48 + 2.46 | 15.77 + 2.19 |
| Wholesale customer | 92.26 + 1.97 | 0.0033 + 1.07e4 | 91.13 + 1.95 | 32.11 + 8.29 |
| IPLD | 71.35 + 2.93 | 0.0065 + 4e−5 | 71.35 + 2.93 | 12.30 + 8.26 |
| Balance | 95.26 + 1.02 | 0.0077 + 1.3e−3 | 95.20 + 1.01 | 8.37 + 1.03 |
| Australian | 85.73 + 2.04 | 0.0076 + 9.75e−5 | 84.49 + 1.18 | 407.97 + 167.73 |
| Crx | 69.56 + 2.79 | 0.0095 + 1.36e−3 | 67.79 + 3.47 | 498.04 + 35.22 |
| Transfusion | 78.19 + 3.25 | 0.0082 + 8.21e−4 | 77.13 + 2.26 | 173.06 + 44.12 |
| Tic tac toe | 74.22 + 5.50 | 0.038 + 4.9e−2 | 73.91 + 6.11 | 24.13 + 6.81 |
| Sorlie3 | 94.084 + 1.54 | 0.165 + 0.15 | 90.19 + 2.47 | 187.50 + 1.37 |
| Secoma | 87.87 + 1.88 | 957.00 + 87.29 | 86.04 + 0.82 | 6359.78 + 15.93 |
| Tiana | 81.71 + 1.43 | 1.39 + 0.67 | 80.92 + 1.39 | 7832.76 + 6.31 |

The following data as provided in Table 1, has been obtained by working with an implementation of the present subject matter for a linear classifier, and 17 published datasets, which are amongst benchmark data sets used in the art to compare different classification methods with each other. The number of data samples and the dimension of each dataset are indicated in the first column of each row alongside the name of the dataset. Test set accuracies are indicated in the format (mean±standard deviation); these are obtained by using a five fold cross validation methodology.

In another exemplary implementations in accordance with aspects of the invention relating to a non-linear classifier, comparisons are provided with results obtained using LIB-SVM, which is a public domain implementation of Support Vector Machines (SVMs). Since SVMs are considered amongst the state-of-the-art methods in machine learning, the data provided is indicative of the advantage of the present subject matter.

Table 3 provides experimental data from implementations involving a non-linear classifier. A radial basis function has been used for the purposes of the present implementation. The data provided in Table 3 demonstrates the increased accuracy of the present subject matter with respect to conventional systems.

distribution, number of training samples denotes the number of training samples, and E(number of support vectors) denotes the expected number of support vectors obtained on training sets of the same size. Although the bound was shown for linearly separable datasets, it does indicate that the number of support vectors is also related to the prediction error. An examination of the table indicates that the proposed approach shows a lower test set error, and also uses a smaller number of support vectors.

Exemplary implementations in accordance with aspects of the invention relating to determining salient or discriminative features, are now discussed with reference to some non-limiting examples. The following data have been obtained based on 5 published datasets, which are amongst

TABLE 3

|  | Present Subject Matter | | | Conventional Art | | |
|---|---|---|---|---|---|---|
| Datasets | Accuracy | CPU time (s) | #SV | Accuracy | CPU time (s) | #SV |
| Blogger | 88.00 + 4.00 | 0.32 + 0.03 | 22.20 + 5.91 | 81.00 + 10.20 | 2573 + 49.2 | 51.20 + 3.06 |
| Fertility diagnosis | 89.00 + 2.00 | 0.18 + 0.09 | 9.80 + 19.60 | 88.00 + 9.27 | 8.03 + 1.95 | 38.20 + 1.60 |
| Promoters | 84.93 + 1.56 | 0.45 + 0.39 | 82.40 + 2.73 | 75.59 + 7.63 | 4.40 + 1.33 | 83.80 + 0.98 |
| Echocardiogram | 89.34 + 4.57 | 0.31 + 0.01 | 12.00 + 0.00 | 87.14 + 7.27 | 8.58 + 1.91 | 48.00 + 2.10 |
| Teaching assistant | 74.83 + 2.60 | 0.39 + 0.13 | 26.60 + 32.43 | 68.88 + 6.48 | 4192 + 162 | 86.00 + 3.22 |
| Hepatitis | 85.80 + 8.31 | 0.44 + 0.02 | 20.00 + 0.00 | 82.57 + 6.32 | 3561 + 4392 | 72.20 + 4.31 |
| Hayes | 81.82 + 7.28 | 0.31 + 0.05 | 3.23 + 1.11 | 79.57 + 6.60 | 1427 + 54.7 | 84.20 + 2.04 |
| Plrx | 71.99 + 5.81 | 0.41 + 0.10 | 4.40 + 8.80 | 71.41 + 6.04 | 144.21 + 5816 | 116.2 + 6.14 |
| Seed | 97.13 + 0.95 | 0.79 + 0.01 | 11.20 + 5.71 | 91.90 + 2.86 | 3362 + 85.1 | 51.80 + 1.72 |
| Glass | 96.23 + 2.77 | 1.69 + 0.50 | 36.00 + 11.49 | 90.64 + 5.09 | 20 475 + 832 | 64.80 + 2.40 |
| Heartstatlog | 84.44 + 3.21 | 1.32 + 0.76 | 10 + 2.23 | 83.7 + 1.54 | 1547 + 324.52 | 124.6 + 4.15 |
| Horsecolic | 82.33 + 4.03 | 3.84 + 2.31 | 36.60 + 17.70 | 81.33 + 4.14 | 13 267 + 2646 | 187.2 + 3.27 |
| Haberman | 73.49 + 3.85 | 1.23 + 0.32 | 8.50 + 7.00 | 72.81 + 3.51 | 2087 + 750 | 138.2 + 3.27 |
| *Ecoli* | 97.32 + 1.73 | 3.47 + 0.30 | 24.00 + 1.41 | 96.42 + 2.92 | 11 829 + 248 | 57.00 + 4.65 |
| House voters | 95.87 + 1.16 | 4.24 + 0.83 | 17.80 + 8.91 | 95.42 + 2.04 | 8827 + 349 | 93.60 + 3.93 |
| Wholesale customer | 92.72 + 1.54 | 7.31 + 0.93 | 39.00 + 10.64 | 90.90 + 1.90 | 9243 + 362 | 123.40 + 2.15 |
| IPLD | 72.03 + 3.20 | 4.06 + 5.02 | 23.40 + 30.50 | 70.15 + 2.24 | 9743 + 322 | 311.60 + 5.31 |
| Balance | 97.64 + 1.32 | 8.78 + 1.32 | 14.60 + 0.49 | 97.60 + 0.51 | 15 442 + 651 | 143.00 + 4.23 |
| Australian | 85.65 + 2.77 | 103.45 + 18.04 | 108.80 + 1.60 | 84.31 + 3.01 | 94 207 + 4476 | 244.8 + 4.64 |
| Crx | 69.56 + 2.90 | 5.95 + 2.55 | 3.40 + 6.80 | 69.27 + 2.62 | 19 327 + 5841 | 404.4 + 8.69 |
| Transfusion | 77.00 + 2.84 | 7.08 + 0.69 | 6.00 + 3.52 | 76.73 + 2.88 | 18 254 + 1531 | 302.20 + 7.55 |
| Tic tac toe | 98.32 + 0.89 | 12.55 + 0.56 | 10.00 + 0.00 | 93.94 + 2.10 | 18 674 + 973 | 482.60 + 3.93 |
| Sorlie3 | 98.82 + 2.35 | 0.44 + 0.15 | 50 + 4.77 | 97.644 + 2.88 | 78.63 + 9.81 | 68.95 + 3.72 |
| Secoma | 94.11 + 2.23 | 1521 + 75.5 | 382.8 + 44.23 | 92.29 + 0.82 | 38 769.25 + 8.87 | 593.2 + 17.22 |
| Tiana | 97.09 + 3.83 | 2.05 + 0.199 | 70.4 + 3.26 | 95.188 + 4.26 | 88.97 + 3.26 | 75.6 + 1.01 |

In yet another implementation, an alternate bound for the number of support vectors may be provided as:

$$E(P_{error}) \leq \frac{E(\#support\ vectors)}{\#training\ samples}, \quad (86)$$

In the above Equation, where $E(P_{error})$ denotes the expected error on test samples taken from the general benchmark data sets used in the art to compare different classification methods with each other. The chosen datasets comprise high dimensional data. Test set accuracies are indicated in the format mean±standard deviation; these are obtained by using a five-fold cross validation methodology. These experimental results demonstrate that the number of features relied on by the present subject matter are comparatively less when considered with respect to conventional systems.

TABLE 4

| Dataset | Features | | | Test Set Accuracy | | |
|---|---|---|---|---|---|---|
| (samples × dimension) | MCM | ReliefF | FCBF | MCM | ReliefF | FCBF |
| West (49 × 7129) | 32 | 2207 | 1802 | 79.7 ± 6.8% | 65.3 ± 3.2% | 59.19 ± 3.1% |
| Artificial (100 × 2500) | 79 | 1155 | 1839 | 82.1 ± 6.1% | 80.8 ± 2.9% | 80.7 ± 2.2% |
| Cancer (62 × 2000) | 48 | 509 | 1346 | 77.3 ± 6.2% | 74.6 ± 0.9% | 75.8 ± 4.1% |
| Khan (63 × 2308) | 48 | 437 | 897 | 92.7 ± 1.5% | 89.6 ± 5.5% | 91.3 ± 0.5% |
| Gravier (168 × 2905) | 132 | 1096 | 1573 | 83.3 ± 2.6% | 84.5 ± 1.8% | 82.5 ± 1.6% |
| Golub (72 × 7129) | 47 | 2271 | 7129 | 95.8 ± 4.2% | 90.3 ± 4.8% | 95.8 ± 4.2% |

TABLE 4-continued

| Dataset | Features | | | Test Set Accuracy | | |
|---|---|---|---|---|---|---|
| (samples × dimension) | MCM | ReliefF | FCBF | MCM | ReliefF | FCBF |
| Alon (62 × 2000) | 41 | 896 | 1984 | 83.8 ± 3.3% | 82.2 ± 7.4% | 82.1 ± 7.8% |
| Christensen (198 × 1413) | 98 | 633 | 1413 | 99.5 ± 0.7% | 99.5 ± 0.7% | 99.5 ± 0.7% |
| Shipp (77 × 7129) | 51 | 3196 | 7129 | 96.1 ± 0.1% | 93.5 ± 2.1% | 93.5 ± 4.4% |
| Singh (102 × 12600) | 81 | 5650 | 11619 | 91.2 ± 3.9% | 89.2 ± 2.0% | 92.5 ± 2.7% |

In another aspect, the present invention may be configured as a minimal complexity regression system. For this we may consider the case of a linear regressor $y = u^T x + v$. For the present implementation, the samples may be considered as fitted by a regressor with zero error, i.e. the regressor lies within an e tube around all training samples. From the link between classification and regression, we may note that for a hyperplane $u^T x + v = 0$, the margin may be the distance of the closest point from the hyperplane, which is turn is provided by:

$$\operatorname*{Min}_{i=1,2,\ldots,M} \frac{\|u^T x^i + v\|}{\|u\|}$$

We therefore have $$\left(\frac{R}{d}\right)^2 = \left(\frac{\operatorname*{Max}_{i=1,2,\ldots,M} \|x^i\|}{\operatorname*{Min}_{i=1,2,\ldots,M} \frac{\|u^T x^i + v\|}{\|u\|}}\right)^2$$

which may be written as $$\left(\frac{R}{d}\right)^2 = \left(\frac{\operatorname*{Max}_{i=1,2,\ldots,M} \|u\|\|x^i\|}{\operatorname*{Min}_{i=1,2,\ldots,M} \|u^T x^i + v\|}\right)^2$$

For the regression analysis, we also consider a gap tolerant parameter, with a margin d which is greater than and equal to $d_{min}$. With this, we obtain the following Equations:

$$\frac{\|u^T x^i + v\|}{\|u\|} \geq d_{min}, \quad (5)$$
$$i = 1, 2, \ldots, M$$

$$\Rightarrow \|u\| \leq \quad (6)$$

which in turn provides the following:

$$\operatorname*{Max}_{i=1,2,\ldots,M} \|u\|\|x^i\| \leq \operatorname*{Max}_{i=1,2,\ldots,M} \|u^T x^i + v\| \cdot \frac{\operatorname*{Max}_{i=1,2,\ldots,M} \|x^i\|}{d_{min}} \quad (7)$$

This can also be represented from the following expression:

$$\operatorname*{Max}_{i=1,2,\ldots,M} \|u\|\|x^i\| \leq \beta \cdot \operatorname*{Max}_{i=1,2,\ldots,M} \|u^T x^i + v\|, \quad (8)$$

β is a constant independent of u and v, and dependent only on the dataset and the choice of $d_{min}$.

This provides the following Equation:

$$\operatorname*{Minimize}_{u,v} \left(\frac{\operatorname*{Max}_{i=1,2,\ldots,M} \|u^T x^i + v\|}{\operatorname*{Min}_{i=1,2,\ldots,M} \|u^T x^i + v\|}\right)^2 = \frac{\operatorname*{Max}_{i=1,2,\ldots,M} \|u^T x^i + v\|^2}{\operatorname*{Min}_{i=1,2,\ldots,M} \|u^T x^i + v\|^2} \quad (9)$$

Since the RHS of the above Equation (square function) is monotonically increasing, the above result may also be achieved by minimizing the function:

$$\frac{\operatorname*{Max}_{i=1,2,\ldots,M} \|u^T x^i + v\|}{\operatorname*{Min}_{i=1,2,\ldots,M} \|u^T x^i + v\|} \quad (10)$$

Without loss of generality, the following assumption may be considered as valid, which in turn provides us with the conclusion that all values are non-negative:

$$y_i \geq \epsilon, \; I = 1, 2, \ldots, M \quad (11)$$

Since the regressor lies within an ε tube around each of the samples, we have $$u^T x^i + v \geq y_i - \epsilon, \; i = 1, 2, \ldots, M \quad (12)$$

$$u^T x^i + v \leq y_i + \epsilon, \; i = 1, 2, \ldots, M \quad (13)$$

Since all function values are non-negative, we have $$\|u^T x^i v\| = u^T x^i + v, \; i = 1, 2, \ldots, M \quad (14)$$

Summing up, the data classification module 112 may solve the following equations to determine the appropriate classifier is obtained by solving the following optimization problem.

$$\operatorname*{Min}_{u,v,g,l} \frac{g}{l} \quad (15)$$

$$g \geq (u^T x^i + v), \quad (16)$$
$$i = 1, 2, \ldots, M$$

$$l \leq (u^T x^i + v), \quad (17)$$
$$i = 1, 2, \ldots, M$$

$$(u^T x^i + v) \geq (y_i - \epsilon), \quad (18)$$
$$i = 1, 2, \ldots, M$$

$$(u^T x^i + v) \leq (y_i - \epsilon), \quad (19)$$
$$i = 1, 2, \ldots, M$$

This is a linear fractional programming problem as also discussed in conjunction with the classifier. We apply the Chames-Cooper transformation. This consists of introducing a variable p=1/l, which we substitute into (14)-(18) to obtain $$\underset{u,v,g,p,l}{\text{Min}}\, h = g \cdot p \quad (20)$$

$$g \cdot p \geq [p \cdot u^T x^i + v], \quad (21)$$
$$i = 1, 2, \ldots, M$$

$$l \cdot p \leq [p \cdot u^T x^i + v], \quad (22)$$
$$i = 1, 2, \ldots, M$$

$$p \cdot (u^T x^i + v) \geq p \cdot (y_i - \epsilon), \quad (23)$$
$$i = 1, 2, \ldots, M$$

$$p \cdot (u^T x^i + v) \leq p \cdot (y_i - \epsilon), \quad (24)$$
$$i = 1, 2, \ldots, M$$

$$p \cdot l = 1 \quad (25)$$

$$p \geq 0 \quad (26)$$

Denoting w=p.u, b=p.v, and noting that p.l=1, we obtain the following:

$$\underset{w,b,h,p}{\text{Min}\, h} \quad (27)$$

$$h \geq [w^T x^i + b], \quad (28)$$
$$i = 1, 2, \ldots, M$$

$$l \leq [w^T x^i + b], \quad (29)$$
$$i = 1, 2, \ldots, M$$

$$w^T x^i + b - p \cdot (y_i - \epsilon) \geq 0 \quad (30)$$

$$w^T x^i + b - p \cdot (y_i - \epsilon) \leq 0 \quad (31)$$

$$p \geq 0 \quad (32)$$

which may be written as:

$$\underset{w,b,h,p}{\text{Min}\, h} \quad (33)$$

$$h \geq [w^T x^i + b], \quad (34)$$
$$i = 1, 2, \ldots, M$$

$$[w^T x^i + b] \geq 1, \quad (35)$$
$$i = 1, 2, \ldots, M$$

$$w^T x^i + b - p \cdot (y_i - \epsilon) \geq 0 \quad (36)$$

$$w^T x^i + b - p \cdot (y_i - \epsilon) \leq 0 \quad (37)$$

$$p \geq 0 \quad (38)$$

Based on the above Equations, the data classification module 112 determines the parameters w, b, and p to provide a regressor as follows:

$$y = u^T x + v, \quad (39)$$

where $$u = \frac{w}{p},$$

and $$v = \frac{b}{p}.$$

In another implementation, we may consider a regression problem with data points $x_i = 1, 2, \ldots, M$, and where the value of an unknown function at the point xi is denoted by $y_i \in \Re$. In the present implementation, it should be noted that the task of building a regressor on this data has a one-to-one correspondence with a binary classification task in which class (−1) points lie at the (n+1)-dimensional co-ordinates $(x^1; y_1-\epsilon), (x^2; y_2-\epsilon), \ldots, (x^M; y_M-\epsilon)$, and class (+1) points lie at the co-ordinates $(x^1; y_1+\epsilon), (x^2; y_2+\epsilon), \ldots, (x^M; y_M+\epsilon)$. In the present implementation, it is first assumed that these set of points are linearly separable, and we learn the classifier that separates the above training points. For the separating hyperplane $w^T x + \eta y + b = 0$, the regressor is given by:

$$y = -\frac{1}{\eta}(w^T x + b)$$

wherein w is column vector containing n elements, in which the elements are variables denoted by $w_1, w_2, \ldots, w_n$ for the vector w. The vector w is used to define a separating hyperplane.

T: denotes the transposition operation; if u is a column vector containing n elements n: dimension of the data, i.e. the number of features or attributes in the data b: is a scalar denoting the offset or bias associated with the hyperplane $w^T x + b = 0$.

From the above, the following Equations follow:

$$\underset{w,b,h}{\text{Min}\, h}$$

$$h \geq 1 \cdot [(w^T x^i + b) + \eta(y_i + \epsilon)],$$
$$i = 1, 2, \ldots, M$$

$$1 \cdot [(w^T x^i + b) + \eta(y_i + \epsilon)] \geq 1,$$
$$i = 1, 2, \ldots, M$$

$$h \geq -1 \cdot [(w^T x^i + b) + \eta(y_i - \epsilon)],$$
$$i = 1, 2, \ldots, M$$

$$-1 \cdot [(w^T x^i + b) + \eta(y_i - \epsilon)] \geq 1,$$
$$i = 1, 2, \ldots, M$$

As would be gathered from above, the first two constraints, correspond to class (+1) samples; the multiplier (+1) corresponds to samples with $y_i = 1$. Similarly, constraints correspond to class (−1) samples; the multiplier (−1) corresponds to samples with $y_i = -1$. After solving, we obtain w and b. The regressor as shown in the preceding paragraph.

In yet another implementation, when the trade-off parameter C is considered, the following Equations may be obtained:

$$\underset{w,b,h,p,q}{\text{Min}}\, h + C \cdot \sum_{i=1}^{M}(q_i^+ + q_i^-) \quad (40)$$

$$h \geq [w^T x^i + b] + q_i^+, \quad (41)$$
$$i = 1, 2, \ldots, M$$

$$[w^T x^i + b] - q_i^- \geq 1, \quad (42)$$
$$i = 1, 2, \ldots, M$$

-continued $$(w^T x^i + b) - p \cdot (y_i - \epsilon) + q_i^- \geq 0 \quad (43)$$

$$(w^T x^i + b) - p \cdot (y_i + \epsilon) - q_i^+ \leq 0 \quad (44)$$

$$p \geq 0; \quad (45)$$
$$q_i^+,$$
$$q_i^- \geq 0,$$
$$i = 1, 2, \ldots, M$$

Solving the above equations provide the same regressor function as follows:

$$y = u^T x + v \quad (46)$$

For non-linearly separable datasets, we consider a mapping function $\phi(x)$ which maps the dataset space to a higher dimension space. A corresponding notional hyperplane may be represented as follows:

$$y = u^T \varnothing(x) + v \quad (47)$$

Based on similar methodology as adopted for linearly separable datasets, we obtain the following equations:

$$\min_{w,b,h,p,q} h + C \cdot \sum_{i=1}^{M} (q_i^+ - q_i^-) \quad (48)$$

$$h \geq [w^T \phi(x^i + b)] + q_i^+, \quad (49)$$
$$i = 1, 2, \ldots, M$$

$$[w^T \phi(x^i) + b] - q_i^- \geq 1, \quad (50)$$
$$i = 1, 2, \ldots, M$$

$$(w^T \phi(x^i) + b) - p \cdot (y_i - \epsilon) + q_i^- \geq 0 \quad (51)$$

$$(w^T \phi(x^i) + b) - p \cdot (y_i + \epsilon) - q_i^+ \leq 0 \quad (52)$$

$$p \geq 0; \quad (53)$$
$$q_i^+,$$
$$q_i^- \geq 0,$$
$$i = 1, 2, \ldots, M$$

As would be understood from above, the vectors of the mapping functions, i.e., $\phi(x^i)$, $i=1, 2, \ldots, M$ form an overcomplete basis in the empirical feature space, in which w also lies. Hence:

$$w = \sum_{j=1}^{M} \lambda_j \phi(x^j) \quad (54)$$

Therefore, $$w^T \phi(x^i) + b = \sum_{j=1}^{M} \lambda_j \phi(x^j)^T \phi(x^i) + b = \sum_{j=1}^{M} \lambda_j K(x^i, x^j) + b, \quad (55)$$

where K(p, q) denotes the Kernel function with input vectors p and q, and is defined as $$K(p,q) = \varnothing(p)^T \varnothing(q). \quad (56)$$

Substituting from (54) into (47)-(52), we obtain the following optimization problem.

$$\min_{w,b,h,p,q} h + C \cdot \sum_{i=1}^{M} (q_i^+ + q_i^-) \quad (57)$$

$$h \geq \left[ \sum_{j=1}^{M} \lambda_j K(x^i, x^j) + b \right] + q_i^+, \quad (58)$$
$$i = 1, 2, \ldots, M$$

$$\left[ \sum_{j=1}^{M} \lambda_j K(x^i, x^j) + b \right] - q_i^- \geq 1, \quad (59)$$
$$i = 1, 2, \ldots, M$$

$$\left( \sum_{j=1}^{M} \lambda_j K(x^i, x^j) + b \right) - p \cdot (y_i - \epsilon) + q_i^- \geq 0 \quad (60)$$

$$\left( \sum_{j=1}^{M} \lambda_j K(x^i, x^j) + b \right) - p \cdot (y_i + \epsilon) + q_i^+ \leq 0 \quad (61)$$

$$p \geq 0; \quad (62)$$
$$q_i^+,$$
$$q_i^- \geq 0,$$
$$i = 1, 2, \ldots, M$$

Once the variables $\lambda_j$, j=1, 2, . . . , M, b, and p are determined by the data classification module 112 by solving (56)-(61). On solving the data classification module 112 obtains the following regressor:

$$y = u^T x + v = \sum_{i=1}^{M} \alpha_j K(x, x^j) + v, \quad (63)$$

where $$\alpha_j = \frac{\lambda_j}{p},$$

and $$v = \frac{b}{p}.$$

The following Table 4 provides results from an experimental implementation indicating comparative performances of systems implementing the present subject matter and conventional systems:

TABLE 4

| Linear MCM regression results | | |
|---|---|---|
| | Mean Squared Error | |
| Dataset (Dimensions) | Present Subject Matter | Conventional Systems |
| Autompg (398 × 8) | 0.35 ± 0.02 | 0.36 ± 0.03 |
| Yacht (308 × 7) | 104.8 ± 7.5 | 161.8 ± 68.4 |
| Price (159 × 16) | 33.6 ± 12.5 | 32.8 ± 23.2 |
| | (in million dollars) | (in million dollars) |
| Machine (209 × 7) | 6.5368 ± 3.6512 | 19.948 ± 15.521 |
| | (thousand units) | (thousand units) |
| Baseball (337 × 17) | 0.80 ± 0.12 | 1.62 ± 0.61 |
| | (in million dollars) | (in million dollars) |
| Housing (506 × 13) | 23.09 ± 4.26 | 25.92 ± 9.61 |
| Energy Efficiency (768 × 8) | 8.74 ± 1.35 | 9.08 ± 1.45 |

TABLE 5

Kernel MCM repression results

| Dataset | Mean Squared Error | | Number of Support | |
|---|---|---|---|---|
| | Present Subject Matter | Conventional Systems | Present Subject Matter | Convention al Systems |
| Autompg | 0.31 ± 0.02 | 0.32 ± 0.04 | 26.8 ± 7.9 | 184.2 ± 4.3 |
| Yacht | 0.97 ± 0.42 | 158.86 ± 62.9 | 129.8 | 224.8 ± 0.8 |
| Price | 12.77 ± 9.0 (mill. $) | 39.48 ± 26.9 (mill. $) | 68.6 | 126.4 ± 0.9 |
| Machine | 7.588 ± 3.909 (th. units) | 26.351 ± 21.330 (th. units) | 52.4 ± 27.3 | 166.4 ± 1.5 |
| Baseball | 0.78 ± 0.14 (mill. $) | 1.78 ± 0.67 (mill. $) | 24.4 ± 6.8 | 269.2 ± 1.1 |
| Housing | 25.8 ± 4.64 | 29.72 ± 5.96 | 76.4 | 386.8 |
| Energy Efficiency | 4.1 ± 0.2 | 7.64 ± 1.31 | 44 ± 3.39 | 557 ± 5.05 |

Table 5 summarizes five fold cross validation results of the kernel MCM regressor on a number of datasets. The width of the Gaussian kernel was chosen by using a grid search. The table shows the mean squared error and the number of support vectors for both the kernel MCM and the classical SVM with a Gaussian kernel. The results indicate that the kernel MCM yields better generalization than the SVM. In the case of kernel regression, the MCM uses fewer support vectors —note that in the case of some of the datasets, the MCM uses less than one-tenth the number of support vectors required by a SVM. The large difference with the SVM results indicates that despite good performance, SVMs may still be far from the optimal solution.

As would be understood from above, the system implementing the present subject matter utilized less number of kernels, thereby reducing the overall computing resources which would be required for data classification and also reducing the mean error in classification. This would result in an increase in the accuracy of the system for data classification. As would be understood, the present subject matter provides more efficient systems and methods for data classification, when considered with respect to the conventional systems known in the art.

Figure 2:
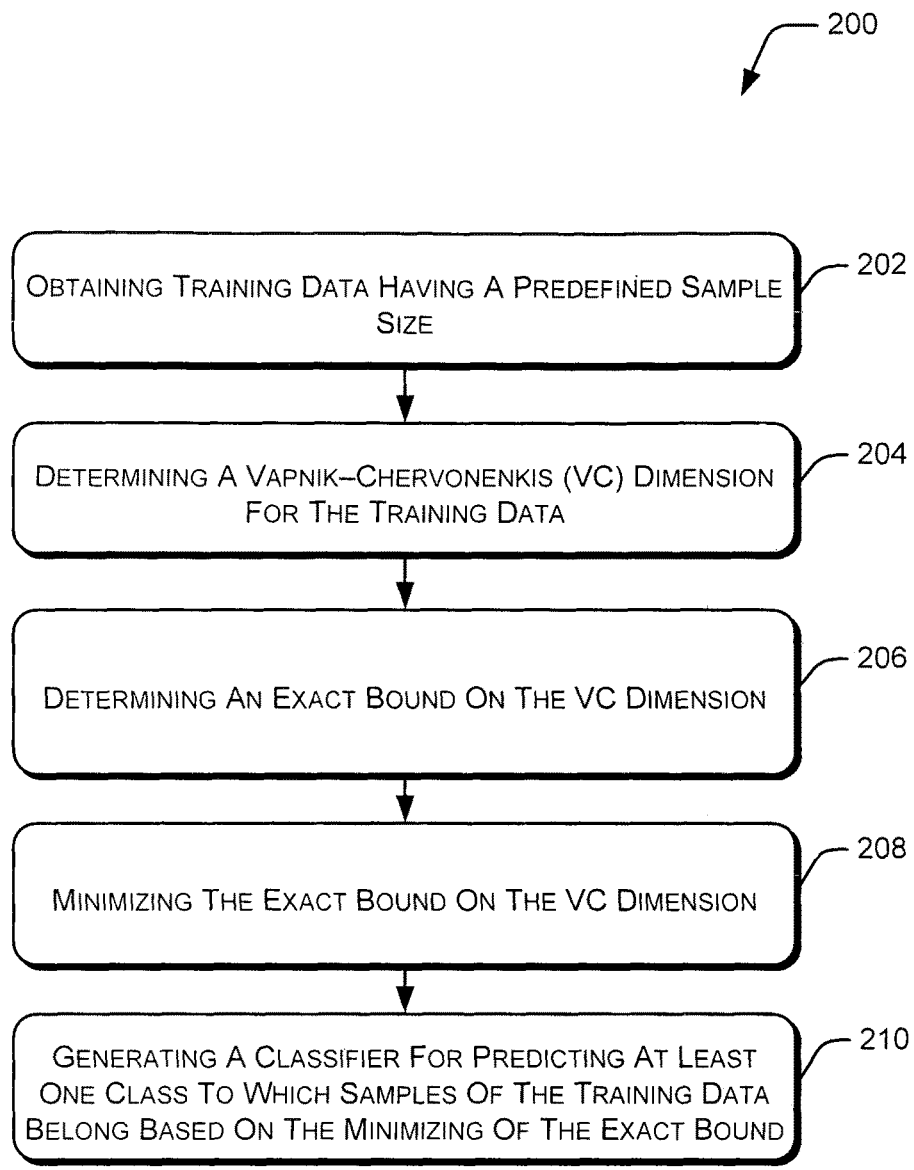
FIG. 2 is a flowchart of a method for classifying data, as per an example of the present subject matter.

FIG. 2 illustrates method 200 for classifying data based on a maximum margin classifier having a low VC dimension. The order in which the method is described is not intended to be construed as a limitation, and any number of the described method blocks may be combined in any order to implement the aforementioned methods, or an alternative method. Furthermore, method 200 may be implemented by processing resource or computing device(s) through any suitable hardware, non-transitory machine readable instructions, or combination thereof.

It may also be understood that method 200 may be performed by programmed computing devices, such as the data classification system 100 as depicted in FIGS. 1 and 2. Furthermore, the method 200 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. Although, the method 200 is described below with reference to the data classification system 100 as described above, other suitable systems for the execution of these methods can be utilized. Additionally, implementation of these methods is not limited to such examples.

At block 202, training data having a predefined sample size is obtained. In one implementation, the training data is composed of separable datasets. The training data may either be linearly or non-linearly separable. In another implementation, the training data may be obtained by the data classification module 112 from the training data 116.

At block 204, a Vapnik-Chervonenkis (VC) dimension is determined for the training data. For example, the VC dimension may be determined by the data classification module 112. As would be understood, VC dimension attempts to generalize one or more conditions based on the training data. The VC dimension may be considered as indicative of a capacity of a classification approach or the complexity of the system under consideration.

At block 206, an exact bound of the VC dimension is determined. For example, the data classification module 112 may determine the exact bound of the VC dimension. In one implementation, the exact bound for a linearly separable data set is provided by the following relation:

$$h = \frac{\text{Max}_{i=1,2,\ldots,M} \|u^T x^i + v\|}{\text{Min}_{i=1,2,\ldots,M} \|u^T x^i + v\|}$$

wherein, $x^i$, $i=1, 2, \ldots, M$ depict data points within the training data

At block 208, the exact bound is minimized to obtain the classifier. For example, the data classification module 112 may minimize the exact bound of the VC dimension to obtain the classifier. In the present example, the data classification module 112 may minimize the following function:

$$\underset{u,v}{\text{Minimize}} \frac{\text{Max}_{u,i=1,2,\ldots,M} \|u^T x^i + v\|}{\text{Min}_{i=1,2,\ldots,M} \|u^T x^i + v\|} \quad (10)$$

for a notional hyperplane which classifies plurality of points within the training data with zero error, represented as $$u^T x + v = 0$$

At block 210, the classifier is generated based on minimized exact bound for predicting at least one class to which samples of the training data belong. In one implementation, the data classification module 112 generates the classifier of classification of data.

Although examples for the present disclosure have been described in language specific to structural features and/or methods, it should be understood that the appended claims are not necessarily limited to the specific features or methods described. Rather, the specific features and methods are disclosed and explained as examples of the present disclosure.

I claim:

1. A method for classifying binary data, the method comprising:
   obtaining training data having a predefined sample size, wherein the training data is composed of separable binary datasets;
   determining an exact bound on Vapnik-Chervonenkis (VC) dimension of a classifier for the training data, wherein the exact bound is based one or more variables defining the hyperplane; and
   minimizing the exact bound on the VC dimension;
   based on the minimizing of the exact bound, determining optimal values of the one or more variables defining the hyperplane; and generating a classifier, based on minimized exact bound, for predicting one class to which a given data sample of the training data belongs, wherein the exact bound is a function of the distances of closest and furthest from amongst the training data from the hyperplane, wherein the hyperplane classifies plurality of points within the training data with zero error, and wherein for a notional hyperplane depicted by the following relation:

$$u^T x+v=0,$$

the exact bound on the VC dimension for the hyperplane is a function of h, being defined by:

$$h = \frac{\text{Max}_{i=1,2,\ldots,M} \|u^T x^i + v\|}{\text{Min}_{i=1,2,\ldots,M} \|u^T x^i + v\|}$$

wherein, $x^i$, $i=1, 2, \ldots, M$ depict data points within training data.

2. The method as claimed in claim 1, wherein the binary datasets are one of linearly separable datasets and non-linearly separable datasets.

3. The method as claimed in claim 1, wherein the function to be minimized is another function of h added to a misclassification error parameter.

4. The method as claimed in claim 1, wherein the minimizing the exact bound further comprises:
reducing the linear fractional programming problem of minimizing the h to obtain a linear programming problem;
by solving the linear programming problem so obtained, obtaining a decision function for classifying the test data.

5. The method as claimed in claim 4, wherein the decision function has a low VC dimension.

6. The method as claimed in claim 4, wherein the objective of the linear programming problem includes a function of the misclassification error.

7. A system for classifying test data, the system comprising:
a processor; and
a data classification nodule, wherein the data classification module is to,
obtaining training data having a predefined sample size, wherein the training data is composed of separable binary datasets having;
determining an exact bound on the Vapnik-Chervonenkis (VC) dimension of a hyperplane for the training data, wherein the exact bound depends on one or more variables defining the hyperplane minimizing the exact bound on the VC dimension
based on the minimizing of the exact bound, determining optimal values of the one or more variables defining the hyperplane; and generating a classifier based on the minimized exact bound for predicting one class to which a given data sample of the training data belongs,
wherein the exact bound is a function of the distances of closest and furthest from amongst the training data from the hyperplane, wherein the hyperplane classifies plurality of points within the training data with zero error; and wherein for a notional hyperplane depicted by the following relation:

$$u^T x+v=0,$$

the exact bound on the VC dimension for the hyperplane is a function of h, being defined by:

$$h = \frac{\text{Max}_{i=1,2,\ldots,M} \|u^T x^i + v\|}{\text{Min}_{i=1,2,\ldots,M} \|u^T x^i + v\|}$$

wherein, $x^i$, $i=1, 2, \ldots, M$ depict data points within training data.

8. The system as claimed in claim 7, wherein the data classification module for nonlinearly separable datasets in a first dimension, is to map samples of the training data from the first dimension to a higher dimension using a mapping function $\Phi$.

9. The system as claimed in claim 7, wherein for the notional hyperplane depicted by the relation $u^T \Phi(x)+v=0$, the data classification module is to:
minimize an exact bound on the VC dimension of the hyperplane wherein the said classifier separates samples that have been transformed from the input dimension to a higher dimension by means of the mapping function ($\Phi$); wherein the minimization task is achieved by solving a fractional programming problem that has been reduced to a linear programming problem.

10. The system as claimed in claim 7, where data classification module utilizes a Kernel function K, wherein,
K is a function of two input vectors 'a' and 'b', with K being positive definite; and
$K(a,b) = \Phi(a)^T \Phi(b)$ with $K(a,b)$ being an inner product of the vectors obtained by transforming vectors 'a' and 'b' into a higher dimensional space by using the mapping function $\Phi$.

11. The system as claimed in claim 7, wherein alternatively the data classification module is to further:
obtain a tolerance regression parameter, for a plurality of points within the training data;
obtain the value of a hypothetical function or measurement at each of said training samples
derive a classification problem in which the samples of each of the two classes are determined by using the given data and the tolerance parameter
define a notional hyperplane, wherein the notional hyperplane classifies the plurality of points within the derived classification problem with minimal error; and
based on the notional hyperplane, generates a regressor corresponding to the plurality of points.

12. The system as claimed in claim 11, wherein for the notional hyperplane is defined by, $w^T x+\eta y+b=0$, the data classification module generates the regressor defined by, $$y = -\frac{1}{\eta}(w^T x + b)$$

13. The system as claimed in claim 12, wherein for the points forming a linearly separable dataset, the regressor is a linear regressor.

14. The system as claimed in claim 12, wherein for the points forming a nonlinearly separable dataset, the regressor is a kernel regressor.

15. The system as claimed in claim 12, wherein the regressor further includes an error parameter.

16. The method as claimed in claim 6, in which the solution of the linear programming problem yields a set of weights or co-efficients, with each weight corresponding to an input feature, attribute, or co-ordinate, and wherein the set of input features with non-zero weights constitutes a set of selected features to allow feature selection.

17. The method as claimed in claim 16, in which only the selected features are used to next compute a classifier, thus eliminating the noise or confusion introduced by features that are less discriminative.

18. The method as claimed in claim 3, in which the constraints are modified so that one of the terms of the objective function is non-essential and can be removed.

19. The method as claimed in claim 18, in which the removal of a term in the objective function removes the need to choose a hyper-parameter weighting the misclassification error, thus simplifying the use of the said method.

20. The method as claimed in claim 15, in which the constraints are modified so that one of the terms of the objective function is non-essential and can be removed.

21. The method as claimed in claim 1, wherein the Max function is replaced by a "soft Max" function in which distance is measured as a weighted function of distances from a plurality of hyperplanes, and in which the Min function is replaced by a "soft Min" function.

22. The system as claimed in claim 12, in which the Max function is replaced by a "soft Max" function in which distance is measured as a weighted function of distances from a plurality of hyperplanes, and in which the Min function is replaced by a "soft Min" function.

\* \* \* \* \*